United States Patent
Diekmeyer et al.

(10) Patent No.: US 7,946,660 B2
(45) Date of Patent: May 24, 2011

(54) ELECTRONIC COMPRESSED-AIR SYSTEM

(75) Inventors: Heinrich Diekmeyer, Barsinghausen (DE); Hans-Ulrich Bornhof, Burgwedel (DE); Frank-Dietmar Lippelt, Barsinghausen (DE)

(73) Assignee: WABCO GmbH, Hannover (DE)

( * ) Notice: Subject to any disclaimer, the term of this patent is extended or adjusted under 35 U.S.C. 154(b) by 1128 days.

(21) Appl. No.: 10/566,016

(22) PCT Filed: Jul. 12, 2004

(86) PCT No.: PCT/EP2004/007649
§ 371 (c)(1), (2), (4) Date: Feb. 21, 2007

(87) PCT Pub. No.: WO2005/014357
PCT Pub. Date: Feb. 17, 2005

(65) Prior Publication Data
US 2007/0246998 A1  Oct. 25, 2007

(30) Foreign Application Priority Data

Jul. 28, 2003 (DE) .................. 103 34 319
Dec. 10, 2003 (DE) .................. 103 57 763

(51) Int. Cl.
*B60T 13/74* (2006.01)
(52) U.S. Cl. ............................. 303/3; 303/15
(58) Field of Classification Search .......... 303/2, 3, 303/13, 15, 16, 17
See application file for complete search history.

(56) References Cited

U.S. PATENT DOCUMENTS

| 4,218,882 A | 8/1980 | Farr |
| 4,484,784 A | 11/1984 | Leiber |
| 6,089,831 A | 7/2000 | Bruehmann et al. |
| 6,276,761 B1 | 8/2001 | Beck |
| 6,367,887 B1 | 4/2002 | Sulzyc |

FOREIGN PATENT DOCUMENTS

| DE | 2837806 A1 * | 8/1978 |
| DE | 28 21 393 A1 | 11/1978 |
| DE | 29 50 904 C2 | 6/1981 |
| DE | 34 35 089 A1 | 4/1986 |
| DE | 41 09 741 C1 | 3/1992 |
| DE | 40 30 361 A1 | 4/1992 |

(Continued)

OTHER PUBLICATIONS

EPO machine translation of DE 2837806, Aug. 1978.*

(Continued)

*Primary Examiner* — Thomas J Williams
(74) *Attorney, Agent, or Firm* — Kramer Levin Naftalis & Frankel LLP

(57) ABSTRACT

An electronic compressed-air system includes a compressed-air supply part having a compressor and a consumer part having load circuits. The load circuits are supplied with compressed-air via solenoid valves. At least one load circuit is provided with a pressure reservoir. The pressure in the load circuits is monitored by pressure sensors, whose signals are evaluated by an ECU that controls the solenoid valves. The load circuits include service-brake circuits having a compressed-air reservoir, secondary load circuits and a high-pressure circuit, wherein the solenoid valves of the service-brake circuits and the solenoid valves of the secondary load circuits are open in a de-energized normal state and the solenoid valve of the high-pressure circuit is closed in the de-energized normal state.

8 Claims, 1 Drawing Sheet

FOREIGN PATENT DOCUMENTS

| | | |
|---|---|---|
| DE | 195 15 895 A1 | 10/1996 |
| DE | 196 22 095 A1 | 12/1997 |
| DE | 198 11 305 A1 | 9/1999 |
| DE | 199 28 113 C1 | 10/2000 |
| DE | 694 26 513 T2 | 2/2001 |
| DE | 199 39 529 A1 | 4/2001 |
| DE | 100 04 091 A1 | 8/2001 |
| DE | 100 29 125 A1 | 1/2002 |
| DE | 101 42 790 A1 | 3/2003 |
| EP | 0 477 519 A1 | 4/1992 |
| EP | 0 810 136 A1 | 12/1997 |
| EP | 0 810 136 B1 | 12/1997 |
| EP | 1 004 495 B1 | 5/2000 |
| EP | 1 122 140 A1 | 8/2001 |
| WO | WO 96/34785 | 11/1996 |
| WO | WO 98/47751 | 10/1998 |

OTHER PUBLICATIONS

EU Directive 98/12; Jan. 27, 1998.

* cited by examiner

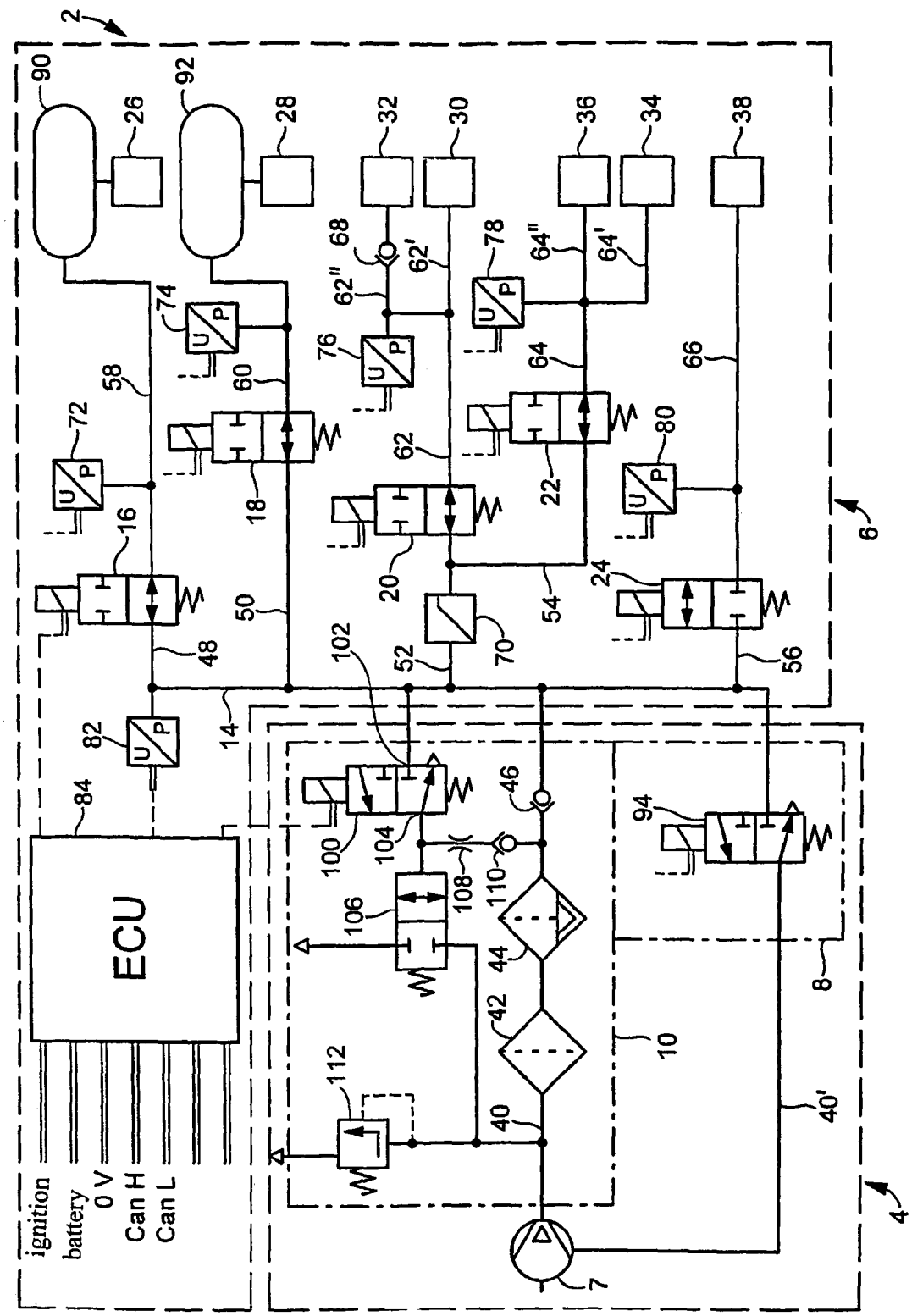

ELECTRONIC COMPRESSED-AIR SYSTEM

BACKGROUND OF THE INVENTION

The present invention relates to an electronic compressed-air system for vehicles.

WO 98/47751 A1 describes a pneumatic vehicle brake system provided with a compressor, at least one air-load circuit, such as service-brake circuits, a parking-brake circuit, a low-pressure auxiliary circuit and a high-pressure circuit, wherein the circuits are provided with compressed-air reservoirs and demand valves. Between the compressor and the at least one load circuit, there are disposed first electrically actuatable valves, which are closed in the de-energized normal state, and, between the compressor and the auxiliary circuit, there is disposed a second electrically actuatable valve, which is open in the de-energized normal state. The valves are actuated by an electronic control unit. The outlet ports of the first valves of the air-load circuits are in communication via check valves with the outlet port of the second valve, which is open in the de-energized normal state. If a compressed-air demand exists in one of the load circuits, for example due to too-low reservoir pressure, the corresponding valve is activated by the control unit, whereby the air demand is covered by the compressor, while at the same time the second valve of the auxiliary circuit is closed. Failure of the compressor leads to a pressure drop, which is detected by the control unit, which closes the valves or keeps them closed, whereby the pressure in the circuits is maintained. A pressure-regulating valve determines the pressure level. In the event of failure of the pressure-regulating valve, overpressure is relieved via an overpressure valve. Pressure sensors monitor the circuits. The circuits are supplied with air via the second, normally open valve and via the check valves connected upstream from the circuits. If the electrical system fails, all valves go to normal state. Nevertheless, the compressor continues to run and supplies the circuits with air via the second, normally open valve of the auxiliary circuit, the system pressure being determined by a low-pressure relief valve of the auxiliary circuit. If one valve fails, the associated circuit can be supplied with air via the valve of the auxiliary circuit and the check valve. The known system is complex, since each load circuit is equipped with its own compressed-air reservoir.

SUMMARY OF THE INVENTION

Generally speaking, in accordance with the present invention an improved compressed-air system is constructed and arranged in such a way that the need for compressed-air reservoirs can be very largely eliminated.

By virtue of the inventively designed compressed-air system there are achieved cost savings, because all compressed-air reservoirs with the exception of the reservoirs for the service-brake circuits can be dispensed with. Nevertheless, several pressure levels can be achieved.

Still other objects and advantages of the present invention will in part be obvious and will in part be apparent from the specification.

The present invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

The present invention will be described in more detail hereinafter on the basis of the accompanying drawing, in which:

FIG. 1 shows a compressed-air system according to a preferred embodiment of the present invention.

DETAILED DESCRIPTION OF THE PREFERRED EMBODIMENTS

Referring now to FIG. 1, where pressurized-fluid lines are represented by solid lines and electrical lines by broken lines, there is shown a compressed-air system 2 with a compressed-air supply part 4 and a consumer part 6. Compressed-air supply part 4 comprises a compressor 7, a compressor control device 8 and an air-dryer part 10.

Consumer part 6 is provided with a compressed-air distributor line 14, a plurality of electrically actuatable valves, preferably solenoid valves 16, 18, 20, 22, 24 with restoring springs and a plurality of load circuits 26, 28, 30, 32, 34, 36, 38 supplied with compressed-air via the solenoid valves.

From compressor 7, a compressed-air supply line 40 leads via a filter 42, an air dryer 44 and a check valve 46 to distributor line 14, from which there are branched off lines 48, 50, 52, 54, 56 leading to the solenoid valves. From the solenoid valves, compressed-air lines 58, 60, 62, 64, 66 lead to the load circuits. Line 62 splits into lines 62' and 62" leading to circuits 30 and 32, a check valve 68 also being disposed in line 62". A pressure limiter 70 is disposed in supply line 52. Line 54, which leads to solenoid valve 22, branches off downstream from pressure limiter 70. Line 64 splits into lines 64' and 64" leading to circuits 34 and 36.

Pressure sensors 72, 74, 76, 78, 80, 82 monitor the pressure in the load circuits and in distributor line 14, and transmit the respective pressure as a pressure signal to electronic control unit 84, which controls the solenoid valves.

Load circuits 26, 28 can be, for example, service-brake circuits. Load circuit 30 can be a trailer-brake circuit, in which case normally two lines, a supply line and a brake line, lead to the trailer. Load circuit 32 can be a parking-brake circuit with spring accumulator. Load circuits 34 and 36 can be secondary load circuits, such as operator's cab suspension, door controller, etc., in other words, all components that have nothing to do with the brake circuits. Load circuit 38 can be a high-pressure circuit.

Service-brake circuits 26, 28 are provided with compressed-air reservoirs 90, 92 in conformity with EU Directive 98/12.

The inventive compressed-air system makes it possible to dispense with compressed-air reservoirs in circuits 30, 32, 34, 36 and also in high-pressure circuit 38. As an example, it is permissible to supply other load circuits from the service-brake circuits (circuits 26 and 28), provided the braking function or braking action of service-brake circuits 26 and 28 is not impaired.

Via a line 40', compressor 7 is mechanically (pneumatically) controlled by compressor controller 8. Compressor controller 8 comprises a solenoid valve 94 of small nominal width that can be switched by electronic control unit 84. In the de-energized normal state it is vented, as illustrated, whereby compressor 7 is turned on. If compressor 7 is to be turned off, for example because all load circuits are filled with compressed-air, control unit 84 changes over solenoid valve 94 so that the pressure-actuatable compressor is turned off via line 40'. If solenoid valve 94 is switched to de-energized condition, for example because a load circuit needs compressed-air after filling, solenoid valve 94 is again switched to the normal state illustrated in the drawing, whereby line 40' is vented and in this way compressor 7 is turned on.

Air-dryer part 10 comprises a solenoid valve 100 with small nominal width, whose inlet 102 is in communication with distributor line 14 and via whose outlet 104 there is pneumatically switched a shutoff valve 106, which is in communication with supply line 40 of compressor 7 and serves for venting of the air dryer.

When solenoid valve 100 is switched to passing condition, compressor 7 no longer discharges into the load circuits but instead discharges via valve 106 to the atmosphere. At the same time, dry air flows from distributor line 14 (out of reservoirs 90, 92 of the service-brake circuits) via solenoid valve 100, throttle 108 and a check valve 110 through air dryer 44 for regeneration of its desiccant and further via filter 42 and valve 106 to the atmosphere.

Reference numeral 112 denotes an overpressure valve.

Solenoid valves 16, 18, 20, 22, 24 are controlled by control unit 84, solenoid valves 16 to 22 of load circuits 26 to 34 being open in de-energized normal state, while solenoid valve 24 of the high-pressure circuit is closed in de-energized normal state. Pilot-controlled solenoid valves can also be used. The pressure in the circuits is directly monitored at the solenoid valves by pressure sensors 72, 74, 76, 78, 80.

If the pressure were to drop in a load circuit while the solenoid valves were not actuated, for example in circuit 30 (trailer-brake circuit), the compressed-air supply by service-brake circuits 26 and 28 takes place from their compressed-air reservoirs 90, 92 via open solenoid valves 16, 18, 20. In this way it is possible to do without pressure reservoirs in the load circuits (except in the service-brake circuits). Moreover, the switching frequency of the solenoid valves is also reduced. The pressure in load circuits 30 to 36 is adjusted by pressure limiter 70 to a lower level, such as 8.5 bar, than the pressure level of, for example, 10.5 bar in the service-brake circuits.

High-pressure circuit 38 is shut off and therefore is not in communication with the other circuits. The high-pressure circuit usually has a higher pressure than the other load circuits, for example 12.5 bar.

If the reservoir in high-pressure circuit 38 is dispensed with, as described hereinabove, only the reservoir volumes of the service-brake circuits and a small dead volume in the other secondary consumers exist. If a small leak then occurs in the high-pressure circuit, frequent regulation via solenoid valve 24 would normally be required. Because the nominal width of solenoid valve 24 is usually large, the corresponding regulation algorithm is complicated, and so it would be desirable to open the solenoid valve only when the high-pressure circuit actually needs compressed-air. This information about the compressed-air demand of the high-pressure valve sensed by pressure sensor 80 could be transmitted via a CAN data line to control unit 84, which then activates valve 24 and turns on compressor 7 via solenoid valve 94 in order to supply compressed-air to high-pressure circuit 38 from brake circuits 26, 28 and by compressor 7.

High-pressure circuit 38 has a different pressure level than do the further load circuits; nevertheless, it has to be refilled with compressed-air relatively infrequently, and therefore is usually shut off by solenoid valve 24, which is closed in the de-energized normal state. In the event of a demand, it also does not need its compressed-air within a very short time (msec or fractions of seconds), and so, a certain dead time can be tolerated for communication with the control unit and for control of solenoid valve 24. According to the present invention, therefore, the high-pressure circuit is normally kept closed. Circuits 30, 32, 34, 36 are supplied from reservoirs 90 and 92 of service-brake circuits 26 and 28 via valves 16, 18, 20, 22, which are open in de-energized condition during normal driving.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An electronic compressed-air system for a vehicle, comprising a compressed-air supply part and a compressed-air consumer part, said compressed-air supply part including a compressor, said compressed-air consumer part including a plurality of compressed-air load circuits, electrically actuatable valves for supplying compressed-air to said compressed-air load circuits, a compressed-air accumulator associated with at least one of said load circuits, sensors for monitoring pressure in said load circuits, and an electronic control unit for evaluating electrical pressure signals from said sensors and for controlling said electrically actuatable valves, said electrically actuatable valves associated with said load circuits being in open position in a de-energized normal state, said compressed-air load circuits including service-brake circuits having at least one compressed-air accumulator, at least one secondary load circuit without a compressed-air accumulator and a high-pressure circuit at least one of without and with a compressed-air accumulator, ones of said electrically actuatable valves associated with said service-brake circuits and ones of said electrically actuatable valves associated with said at least one secondary load circuit being in open position in said de-energized normal state and an electrically actuatable valve of said high-pressure circuit being in closed position in said de-energized normal state.

2. The compressed-air system according to claim 1, wherein said electrically actuatable valves are solenoid valves.

3. The compressed-air system according to claim 1, wherein the pressure level in said high-pressure circuit is higher than the pressure level in said service-brake circuits.

4. The compressed-air system according to claim 1, wherein said electrically actuatable valves of said consumer part are connected to a common compressed-air distributor line which is connected to a compressed-air supply line.

5. The compressed-air system according to claim 4, further comprising an air dryer and a check valve disposed in said compressed-air supply line.

6. The compressed-air system according to claim 1, wherein at least one of said compressed-air load circuits communicates via a data bus with said electronic control unit.

7. An electronic compressed-air system for a vehicle, comprising a compressed-air supply part and a compressed-air consumer part, said compressed-air supply part including a compressor, said compressed-air consumer part including a plurality of compressed-air load circuits, electrically actuatable valves for supplying compressed-air to said compressed-air load circuits, a compressed-air accumulator associated with at least one of said load circuits, sensors for monitoring pressure in said load circuits, and an electronic control unit for evaluating electrical pressure signals from said sensors and for controlling said electrically actuatable valves, said electrically actuatable valves associated with said load circuits being in open position in a de-energized normal state, said compressed-air load circuits including service-brake circuits having at least one compressed-air accumulator, at least one secondary load circuit without a compressed-air accumulator and a high-pressure circuit at least one of without and with a compressed-air accumulator, ones of said electrically actuatable valves associated with said service-brake circuits and ones of said electrically actuatable valves associated with said at least one secondary load circuit being in open position in said de-energized normal state and an electrically actuatable valve of said high-pressure circuit being in closed position in said de-energized normal state, and wherein the pressure level in said at least one secondary load circuit is lower than the pressure level in said service-brake circuits.

8. An electronic compressed-air system for a vehicle, comprising a compressed-air supply part and a compressed-air consumer part, said compressed-air supply part including a compressor, said compressed-air consumer part including a plurality of compressed-air load circuits, electrically actuatable valves for supplying compressed-air to said compressed-air load circuits, a compressed-air accumulator associated with at least one of said load circuits, sensors for monitoring pressure in said load circuits, and an electronic control unit for evaluating electrical pressure signals from said sensors and for controlling said electrically actuatable valves, said electrically actuatable valves associated with said load circuits being in open position in a de-energized normal state, said compressed-air load circuits including service-brake circuits having at least one compressed-air accumulator, at least one secondary load circuit without a compressed-air accumulator and a high-pressure circuit at least one of without and with a compressed-air accumulator, ones of said electrically actuatable valves associated with said service-brake circuits and ones of said electrically actuatable valves associated with said at least one secondary load circuit being in open position in said de-energized normal state and an electrically actuatable valve of said high-pressure circuit being in closed position in said de-energized normal state, and a pressure-limiting valve interposed upstream from said electrically actuatable valves associated with said at least one secondary load circuit.

* * * * *